US012585395B2

(12) United States Patent
Symes et al.

(10) Patent No.: US 12,585,395 B2
(45) Date of Patent: Mar. 24, 2026

(54) DATA STORAGE

(71) Applicant: Arm Limited, Cambridge (GB)

(72) Inventors: Dominic Hugo Symes, Cambridge (GB); Rune Holm, Oslo (NO)

(73) Assignee: Arm Limited, Cambridge (GB)

( * ) Notice: Subject to any disclaimer, the term of this patent is extended or adjusted under 35 U.S.C. 154(b) by 243 days.

(21) Appl. No.: 18/485,419

(22) Filed: Oct. 12, 2023

(65) Prior Publication Data

US 2024/0134553 A1     Apr. 25, 2024
US 2024/0231661 A9     Jul. 11, 2024

(30) Foreign Application Priority Data

Oct. 24, 2022    (GB) ..................................... 2215724

(51) Int. Cl.
*G06F 3/06*       (2006.01)

(52) U.S. Cl.
CPC ............ *G06F 3/064* (2013.01); *G06F 3/0604* (2013.01); *G06F 3/0659* (2013.01); *G06F 3/0673* (2013.01)

(58) Field of Classification Search
CPC ...... G06F 3/064; G06F 3/0659; G06F 3/0622; G06F 3/0679
See application file for complete search history.

(56) References Cited

U.S. PATENT DOCUMENTS

| | | | |
|---|---|---|---|
| 11,620,503 B2 | 4/2023 | Symes et al. | |
| 2020/0279133 A1 | 9/2020 | Baum et al. | |
| 2024/0126602 A1* | 4/2024 | Olson ................... | G06F 9/5016 |
| 2024/0248721 A1* | 7/2024 | Holm .................... | G06F 9/3885 |
| 2024/0248754 A1* | 7/2024 | Rosemarine .......... | G06F 9/4881 |

FOREIGN PATENT DOCUMENTS

| | | |
|---|---|---|
| EP | 3330900 A1 | 6/2018 |
| GB | 2628878 A1 | 10/2024 |
| WO | 2020252762 A1 | 12/2020 |
| WO | 2024153909 A1 | 7/2024 |

* cited by examiner

*Primary Examiner* — Prasith Thammavong
(74) *Attorney, Agent, or Firm* — EIP US LLP

(57) ABSTRACT

A processor to obtain mapping data indicative of at least one mapping parameter for a plurality of mapping blocks of a multi-dimensional tensor to be mapped. The at least one mapping parameter is for mapping corresponding elements of each mapping block to the same co-ordinate in at least one selected dimension of the multi-dimensional tensor, such that each mapping block corresponds to the same set of co-ordinates in the at least one selected dimension. A co-ordinate of an element of a block of the multi-dimensional tensor is determined. The element is comprised by a mapping block. A physical address in a storage corresponding to the co-ordinate is determined, based on the co-ordinate. The physical address is utilized in a process comprising an interaction between the block of the multi-dimensional tensor and the storage.

20 Claims, 3 Drawing Sheets

DATA STORAGE

CROSS-REFERENCE TO RELATED APPLICATIONS

This application claims the benefit under 35 U.S.C. § 119(a) and 37 CFR § 1.55 to United Kingdom patent application no. GB2215724.2 filed on Oct. 24, 2022 the entire content of which is incorporated herein by reference.

BACKGROUND

Technical Field

The present invention relates to methods, processors, and non-transitory computer-readable storage media for handling the usage of storage for storing data.

Description of the Related Technology

Certain data processing techniques, such as neural network processing and graphics processing, involve the processing and generation of considerable amounts of data. It is desirable to efficiently handle storage of and access to data associated with data-intensive processing techniques such as these.

SUMMARY

According to a first aspect of the present invention there is provided a processor to: obtain mapping data indicative of at least one mapping parameter for a plurality of mapping blocks of a multi-dimensional tensor to be mapped, wherein the at least one mapping parameter is for mapping corresponding elements of each mapping block to the same co-ordinate in at least one selected dimension of the multi-dimensional tensor, such that each mapping block corresponds to the same set of co-ordinates in the at least one selected dimension; determine, based on the mapping data, a co-ordinate of an element of a block of the multi-dimensional tensor, a mapping block of the plurality of mapping blocks comprising the element; determine, based on the co-ordinate, a physical address in a storage corresponding to the co-ordinate; and utilize the physical address in a process comprising an interaction between the block of the multi-dimensional tensor and the storage.

In this way, the processor can utilize the storage for blocks of the multi-dimensional tensor, so that the storage can be of a smaller size than if it is to be utilized for the entire multi-dimensional tensor. For example, the processor can utilize the physical address obtained in this manner in a process comprising an interaction such as reading a block from the storage and/or writing the block to the storage. A smaller storage can for example be accessed more efficiently than larger memory, such as a main system memory. Furthermore, this approach for example provides a relatively straightforward way of mapping of logical addresses to appropriate physical addresses in the storage. For example, logical addresses of corresponding elements of respective blocks can be mapped to the same physical addresses. The at least one mapping parameter is for a plurality of mapping blocks, and for example allows the mapping to be represented with less complexity than a mapping that varies on a block-by-block basis. Indeed, this mapping is for example the same for each block of the multi-dimensional tensor, allowing the mapping to be represented compactly by the mapping data. This for example allows the physical addresses for elements of the multi-dimensional tensor to be determined more straightforwardly, simplifying the writing and/or reading of the multi-dimensional tensor to and/or from the storage.

The processor may receive a command to apply a sequence of operations recursively to an input multi-dimensional tensor and apply the sequence of operations in turn to respective blocks of a plurality of blocks of the input multi-dimensional tensor. In such cases, the block of the multi-dimensional tensor may be a block of an intermediate multi-dimensional tensor generated by application of part of the sequence of operations to a corresponding block of the input multi-dimensional tensor. This for example allows the processor to efficiently perform cascaded sequences of operations. In other words, rather than applying a sequence of operations to an entire input multi-dimensional tensor, the sequence of operations can instead be applied, in turn, to blocks of the input multi-dimensional tensor, to generate the intermediate multi-dimensional tensor on a block-by-block basis. This for example removes the need to store the entire intermediate multi-dimensional tensor, allowing a smaller storage to be used.

The block of the intermediate multi-dimensional tensor may be a block of a first intermediate multi-dimensional tensor generated by application of a first part of the sequence of operations to the input multi-dimensional tensor. In such cases, the processor may read the block of the first intermediate multi-dimensional tensor from the storage; apply a second part of the sequence of operations, immediately subsequent to the first part of the sequence of operations, to the block of the first intermediate multi-dimensional tensor to generate a corresponding block of a second intermediate multi-dimensional tensor; and write the block of the second intermediate multi-dimensional tensor to the storage, based on the mapping data, to at least partially overwrite the block of the first intermediate multi-dimensional tensor. With this approach, the first intermediate multi-dimensional tensor can for example be retrieved quickly from the storage for processing with the second part of the sequence of operations. This for example allows the sequence of operations to be performed more efficiently than other approaches.

The at least one mapping parameter may be representative of: which of a plurality of dimensions of the multi-dimensional tensor is the at least one selected dimension, a size of each mapping block in each of the at least one selected dimension and/or an indication that each of at least one other dimension of the multi-dimensional tensor is unmapped. This for example allows the mapping to be calculated in a simple manner. For example, the at least one mapping parameter may be representative of the size, s, of each mapping block in each of the at least one selected dimension, and the mapping may correspond to a modulo s operation applied to a given logical co-ordinate of a given element of the mapping block, in each of the at least one selected dimension. The size may be the same in each of the at least one selected dimension or may differ between different dimensions of the at least one selected dimension.

The at least one mapping parameter may be representative of a reciprocal of the size, s, of each mapping block in each of the at least one selected dimension. This may further improve the efficiency of the determination of a physical address for interaction with a given element of a multi-dimensional tensor. For example, where the mapping corresponds to a modulo s operation applied to a logical co-ordinate, the mapping in a particular dimension may be determined using the reciprocal of the size without performing a division operation. The mapping may thus be determined in a less computationally intensive manner than in other approaches involving the use of a division operation.

To determine, based on the mapping data, the logical co-ordinate of the element of the block of the multi-dimensional tensor, the processor may perform the mapping. This for example obviates the need to adjust data processing routines in software to account for the mapping, as the processor can straightforwardly convert references to logical addresses in such routines to appropriate physical addresses in the storage, so as to perform the desired data processing or other interaction with the block of the multi-dimensional tensor. For example, the mapping may comprise, in a dimension of the at least one dimension: a bit-shift operation applied to an output of a multiplication of a reciprocal of a size of the mapping block in the dimension and the logical co-ordinate in the dimension, to calculate a quotient of the logical co-ordinate by the size; and a subtraction of a further multiplication, of the quotient with the size, from the logical co-ordinate in the dimension. This can for example be performed in a computationally efficient manner by the processor. In these examples, the mapping data may comprise a shift value for performing the bit-shift operation. This may facilitate the calculation of the mapping without performing a division, to allow the mapping to be determined more efficiently. It is to be appreciated that the same or a similar process may be performed to determine the mapping in each of the other at least one selected dimension (if there are a plurality of selected dimensions).

The processor may receive a tensor descriptor comprising the mapping data. The tensor descriptor may be associated with the multi-dimensional tensor and comprise tensor data indicative of at least one further parameter to define the multi-dimensional tensor. This for example improves efficiency, by sending the data to perform the mapping and to define the multi-dimensional tensor together, in the form of a tensor descriptor.

A size of each mapping block of the multi-dimensional tensor in each dimension may be a power of two. This for example facilitates the mapping of corresponding lines of respective blocks to the same physical addresses in a straightforward manner, e.g. by performing a bit-shift operation.

In other examples, though, the at least one selected dimension is a single selected dimension, a size of each mapping block of the multi-dimensional tensor in the single selected dimension is not a power of two and a size of each mapping block of the multi-dimensional tensor in each other dimension is a power of two or is a size of the multi-dimensional tensor in that dimension. This provides flexibility to perform processing involving the use of blocks with a number of lines which is not a multiple of a power of two in one dimension, such as a convolution of blocks with filters with a height that are not a multiple of a power of two (discussed further below). However, having non-power-of-two block sizes in only a single dimension can limit the extra complexity that may be introduced in determining the mapping for non-power-of-two block heights.

The mapping blocks of the representative multi-dimensional tensor may be non-overlapping. This may simplify the determination of the mapping. However, the blocks which are to be processed using the processor, which may be referred to as processing blocks and may e.g. be blocks that are read from or written to the storage, may not be the same size as the mapping blocks in each dimension. For example, the multi-dimensional tensor may comprise a plurality of processing blocks, comprising the block, for processing using the processor, and the plurality of processing blocks of the multi-dimensional tensor may partly overlap each other. This for example allows the processing blocks to be processed using operators that are not elementwise, such as multi-dimensional filters. This may allow the methods herein to be used in a wider range of data processing operations. In such cases, the processing blocks of the multi-dimensional tensor may partly overlap each other in the at least one selected dimension. The processing blocks of the multi-dimensional tensor may be non-overlapping in each other dimension. This may simplify the determination of the mapping compared to processing blocks which overlap in a plurality of dimensions, while providing sufficient flexibility to provide support for a wide variety of different processing operations.

The processor may comprise a command processing unit to: receive, from a host processor, a sequence of commands to be executed; generate a plurality of tasks based on the sequence of commands; and issue each of the plurality of tasks to the processor for execution. The processor may comprise: a first processing module for executing tasks of a first task type generated by the command processing unit; and a second processing module for executing tasks of a second task type, different from the first task type, generated by the command processing unit. The storage may be storage accessible to at least the first processing module and the second processing module. Such a processor for example enables the issuance of tasks to different processing modules, which improves the efficiency and resource usage of the processor and reduces component size. For example, tasks can be issued to processing modules that are optimized for performance of a given task type.

The first task type may be a task for undertaking at least a portion of a graphics processing operation forming one of a set of pre-defined graphics processing operations which collectively enable an implementation of a graphics processing pipeline, and the second task type may be a task for undertaking at least a portion of a neural processing operation. This for example enables graphics and neural processing to be performed efficiently.

According to a second aspect of the present invention, there is provided a method performed by a processor, the method comprising: obtaining mapping data indicative of at least one mapping parameter for a plurality of mapping blocks of a multi-dimensional tensor to be mapped, wherein the at least one mapping parameter is for mapping corresponding elements of each mapping block to the same co-ordinate in at least one selected dimension of the multi-dimensional tensor, such that each mapping block corresponds to the same set of co-ordinates in the at least one selected dimension; determining, based on the mapping data, a co-ordinate of an element of a block of the multi-dimensional tensor, a mapping block of the plurality of mapping blocks comprising the element; determining, based on the co-ordinate, a physical address in a storage corresponding to the co-ordinate; and utilizing the physical address in a process comprising an interaction between the block of the multi-dimensional tensor and the storage. As explained above with respect to the first aspect, this for example improves the efficiency and resource usage of the processor, by facilitating use of a storage of a smaller size. Furthermore, the physical addresses for elements of the multi-dimensional tensor can for example be determined in a more straightforward manner than otherwise.

The method may comprise: receiving a command to apply a sequence of operations recursively to an input multi-dimensional tensor; and applying the sequence of operations in turn to respective blocks of a plurality of blocks of the input multi-dimensional tensor, wherein the block of the multi-dimensional tensor is a block of an intermediate multi-dimensional tensor generated by application of part of the sequence of operations to a corresponding block of the input multi-dimensional tensor. This for example allows the sequence of operations to be performed in a cascaded manner to blocks of the input multi-dimensional tensor in turn, improving the efficiency of performing the sequence of operations.

The method may comprise: receiving at a command processing unit, from a host processor, a sequence of commands to be executed; generating, at the command processing unit, a plurality of tasks based on the sequence of commands; and issuing, by the command processing unit, each of the plurality of tasks to the processor. The processor may comprise: a first processing module for executing tasks of a first task type; and a second processing module for executing tasks of a second task type. The storage may be storage accessible to at least the first processing module and the second processing module. As explained above, this for example improves efficiency by enabling tasks of differing types to be issued to different processing modules of the compute units.

According to a third aspect of the present invention, there is provided a non-transitory computer-readable storage medium comprising a set of computer-readable instructions stored thereon which, when executed by at least one processor, are arranged to cause the at least one processor to: obtain mapping data indicative of at least one mapping parameter for a plurality of mapping blocks of a multi-dimensional tensor to be mapped, wherein the at least one mapping parameter is for mapping corresponding elements of each mapping block to the same co-ordinate in at least one selected dimension of the multi-dimensional tensor, such that each mapping block corresponds to the same set of co-ordinates in the at least one selected dimension; determine, based on the mapping data, a co-ordinate of an element of a block of the multi-dimensional tensor, a mapping block of the plurality of mapping blocks comprising the element; determine, based on the co-ordinate, a physical address in a storage corresponding to the co-ordinate; and utilize the physical address in a process comprising an interaction between the block of the multi-dimensional tensor and the storage. As explained above with respect to the first aspect, this for example improves the efficiency and resource usage of the processor, by facilitating storage of blocks in comparatively smaller storage. The physical addresses for elements of the multi-dimensional tensor can for example be determined in a more straightforward manner than otherwise.

BRIEF DESCRIPTION OF THE DRAWINGS

Further features will become apparent from the following description of examples, which is made with reference to the accompanying drawings.

DETAILED DESCRIPTION

Examples herein relate to the processing of tensors. As used herein, the term "tensor" is to be considered to refer to a multi-dimensional tensor. A tensor is an array of elements, such as an array of same-typed scalar elements. Tensors can be large, and hence require a considerable amount of storage to be stored in their entirety. For example, the processing performed by a neural network can involve the processing of relatively large tensors. Neural networks can be used for processes such as machine learning, computer vision, and natural language processing operations. A neural network may operate upon suitable input data (e.g. such as an image or sound data, which may be in the form of a tensor) to ultimately provide a desired output (e.g. an identification of an object within an image, or a spoken word within a sound clip, or other useful output inferred from the input data). This process is usually known as "inferencing" or "classification." In a graphics (image) processing context, neural network processing may also be used for image enhancement ("de-noising"), segmentation, "anti-aliasing," super-sampling, etc., in which case a suitable input image (e.g. represented as a tensor) may be processed to provide a desired output image (which may also be represented as a tensor).

A neural network will typically process the input data (e.g. image or sound data, which may be in the form of a tensor) according to a network of operators, each operator performing a particular operation. The operations will generally be performed sequentially to produce desired output data (e.g. a classification based on the image or sound data). Each operation may be referred to as a "layer" of neural network processing. Hence, neural network processing may comprise a sequence of "layers" of processing, such that the output from each layer is used as an input to a next layer of processing.

To allow tensors to be processed efficiently, e.g. for neural network inferencing, examples herein involve interactions between blocks of a tensor and a storage, e.g. writing blocks to the storage and/or reading blocks from storage, allowing a smaller storage to be used than if the storage is used for the entirety of a tensor. In these examples, blocks may be written to and/or read from the storage based on mapping data indicative of at least one mapping parameter for a plurality of mapping blocks of a multi-dimensional tensor to be mapped. The at least one mapping parameter is for mapping corresponding elements of each mapping block to the same co-ordinate in at least one selected dimension of the multi-dimensional tensor, such that each mapping block corresponds to the same set of co-ordinates in the at least one selected dimension. This for example allows the mapping to be performed straightforwardly.

Figures 1, 2:
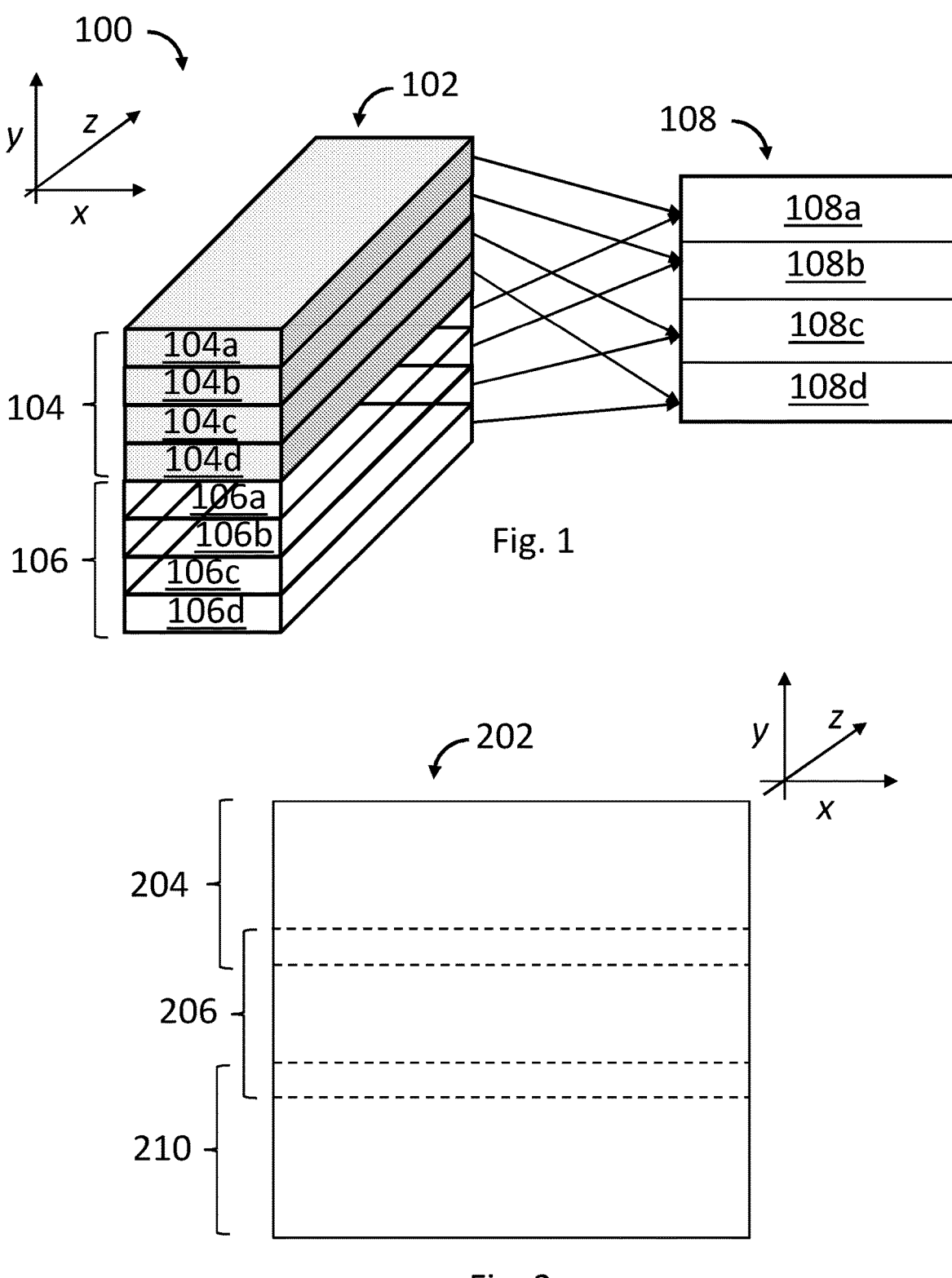
FIG. 1 is a schematic representation of allocation of blocks of a tensor to physical addresses in a storage according to examples.
FIG. 2 is a schematic representation of a tensor with overlapping blocks according to examples.

FIG. 1 is a schematic representation of an example 100 of allocation of blocks of a tensor 102 to physical addresses in storage 108 according to an example. In this example, the blocks are processing blocks, which are to be processed by the processor (and which are e.g. to be read from and/or written to the storage 108). In this case, the processing blocks correspond to mapping blocks (for which corresponding elements of each block are to be mapped to the same co-ordinate in at least one selected dimension). In other examples, though, processing blocks may be of a different size to mapping blocks. The tensor 102 of FIG. 1 is a three-dimensional tensor, but in other examples tensors may have more or fewer dimensions. The tensor 102 includes a first block 104 and a second block 106, which are adjacent to each other and each correspond to a respective sub-tensor. A block of a tensor, such as a processing block or a mapping block, is for example a portion of the tensor 102 with a limited size at least one dimension (i.e. with a size in the at least one dimension which is less than a total size of the tensor in that at least one dimension). For example, a portion of the tensor 102 with a limited size in a single dimension and an unlimited size in each other dimension corresponds to a block of the tensor in the form of a stripe. In other cases, though, a block may correspond to a portion of the tensor 102 with a limited size in a plurality of dimensions.

In FIG. 1, the first and second blocks 104, 106 are horizontal stripes, which are constrained in size along a y axis in FIG. 1 and are unconstrained in size along x and z axes (although it is to be appreciated that the extent of the blocks in the x and z directions in FIG. 1 is truncated for ease of illustration). In other words, the size of the first and second blocks 104, 106 is less than the size of the tensor in the y direction and the size of the first and second blocks 104, 106 is the same as the size of the tensor in the x and z directions.

The first block 104 includes four lines of elements, labelled as 104a-104d in FIG. 1. The second block 106 also has four lines of elements, labelled as 106a-106d in FIG. 1. The first and second block 104, 106 do not overlap each other, but in other examples processing blocks may be partly overlapping, as discussed further with reference to FIGS. 2 and 4. In FIG. 1, the elements of corresponding lines of the first block 104 and the second block 106 are mapped to be mapped to the same co-ordinate in the y direction, so that each block is mapped to the same set of physical addresses in the storage 108. In the example of FIG. 1, the storage 108 is shown schematically as including four portions, labelled 108a-108d, each of which is sized to store a line of a block of the tensor 102. However, this is merely an example, and in other examples, storage may not be divided into portions in this way or may include more portions than the number of lines in a block. For example, the storage may instead merely include a plurality of storage locations, each having a physical address, with the co-ordinates of elements of corresponding lines of each block corresponding to the same physical addresses within the storage.

In FIG. 1, logical co-ordinates of elements of the first line 104a of the first block 104 are mapped to co-ordinates (which may be referred to as physical co-ordinates) corresponding to physical addresses of locations in a first portion 108a of the storage 108. Logical co-ordinates of elements of the first line 106a of the second block 106 are mapped to the same (physical) co-ordinates, and hence to the same physical addresses as corresponding elements of the first line 104a of the first block 104. Hence, a logical co-ordinate of a first element of the first line 104a of the first block 104 is mapped to a physical address corresponding to a first location within the first portion 108a of the storage. A logical co-ordinate of a corresponding first element of the first line 106a of the second block 106 (e.g. having the same position within the second block 106 as the position of the first element within the first block 104) is mapped to the same physical address as the first element of the first block 104, which in this case corresponds to the first location. Logical co-ordinates of corresponding elements of the first lines 104a, 106a of the first and second blocks 104, 106 are each similarly mapped to the same physical addresses as each other, each corresponding to the same respective locations within the first portion 108a of the storage (e.g. such that logical co-ordinates of first, second, third etc. elements of the first lines 104a, 106a of the first and second blocks 104, 106 are mapped to physical addresses corresponding to first, second, third etc. locations in the first portion 108a of the storage, respectively). The logical co-ordinates of elements of the second, third and fourth lines 104b-104d, 106b-106d of the first and second blocks 104, 106 are similarly each mapped to the same physical addresses as each other, corresponding to locations in second, third and fourth portions 108b-108d of the storage respectively. In this example, the same mapping is used for a plurality of mapping blocks, allowing the mapping to be defined and determined more straightforwardly than mapping that varies between different portions of a tensor.

With logical co-ordinates of corresponding elements of each block being mapped to the same (physical) co-ordinates, corresponding to the same physical addresses, writing an element of a block into the storage 108 in accordance with such a mapping for example overwrites the corresponding element of a previous block that was already stored in the storage 108. For example, if the first block 104 is first written to the storage 108, with first to fourth lines 104a-104d of the first block 104 stored in first to fourth portions 108a-108d of the storage, subsequently writing the second block 106 to the storage 108 overwrites the first block 104 in the storage 108. The first to fourth lines 104a-104d of the first block 104 are overwritten in the storage 108 by the first to fourth lines 106a-106d of the second block 106, respectively. Overwriting such as this is for example performed after the first to fourth lines 104a-104d of the first block 104 are read from the storage 108, e.g. in order to apply a particular operation to the first to fourth lines 104a-104d of the first block 104. In this way, the storage 108 is re-used to store blocks of the tensor 102. For example, the storage 108 may be considered to form a rolling buffer for storage of sub-tensors, each corresponding to a respective block of a tensor. The block of a tensor in the storage 108 can be accessed efficiently from the storage, improving the efficiency with which the blocks can be processed by the processor. It is to be appreciated that, in some cases, a portion of a first block stored in the storage 108 (such as a portion that has already been read) may be overwritten by a portion of a second block, without overwriting a different portion of the first block. In other words, a block may be partially overwritten.

In the example of FIG. 1, the blocks of the tensor 102 are each of the same size in the y dimension, which in this case is 4 lines. Each block 104, 106 hence corresponds to a sub-tensor of the tensor 102, with a size of 4 lines in the y dimension. As explained above, the logical co-ordinates of corresponding elements of each block 104, 106 are mapped to the same (physical) co-ordinates, corresponding to the same physical addresses of the storage 108. This can for example be expressed as a modulo s operation applied to the logical co-ordinates in the y dimension, where s is the size of each block in the y dimension and is equal to 4 lines in this example. This can be expressed as applying the following mapping to the (logical) y co-ordinate of each element of the tensor:

$$y_{physical} = y_{logical} \% \ n$$

where $y_{physical}$ represents the (physical) co-ordinate of a given element of the tensor in the y dimension, $y_{logical}$ represents the logical co-ordinate of the given element in the y dimension, and % represents the modulo operation. In this example, the x and z co-ordinates of each element of the tensor are unchanged. In other words, the mapping is performed in a single dimension. However, in other cases the mapping may be performed in a plurality of dimensions. The (physical) co-ordinates determined in this way each correspond to a respective physical address in the storage 108, so that the logical co-ordinates of corresponding elements of each mapping block are mapped to the same physical addresses in the y dimension.

This mapping is simple to determine, and can for example be calculated straightforwardly by a processor with access to the storage 108. For example, the processor may receive mapping data indicative of a size of each mapping block in each of at least one selected dimension, e.g. expressed as the number of lines n in each of the at least one selected dimension, which can be used to calculate physical co-ordinates, $y_{physical}$, for logical co-ordinates, $y_{logical}$, of elements of a tensor to be processed by the processor, and from which the physical addresses in the storage 108 corresponding to each of the physical co-ordinates can be obtained.

As another example, if a tensor has a three-dimensional size of 1088 high (in the y dimension)×1920 wide (in the x dimension)×16 channels (in the z dimension), which is about 32 megabytes (MB), and is divided into blocks of height 16 in the y dimension, with logical co-ordinates of elements of the blocks mapped to physical co-ordinates in the y dimension according to the mapping: $y_{physical}=y_{logical}$% 16, the storage size can be 16 high×1920 wide×16 channels. A storage of this size has a capacity of about 480 kilobytes (KB), and is for example sufficiently large to store each block of the tensor, one at a time. In other words, each block of 16 rows of the tensor aliases to the same storage. A compiler can for example perform appropriate scheduling to ensure that these aliases are not accessed at the same time.

As explained, the mapping data indicating the mapping may be indicative of at least one parameter indicative of size of each mapping block in each of at least one selected dimension. For example, the mapping data may indicate a size of each mapping block, and/or a reciprocal of the size of each mapping block. A processor can determine the mapping using the mapping data, which may include at least one further parameter to aid in calculating (physical) co-ordinates from logical co-ordinates. The mapping may for example include a bit-shift operation.

In one example, the mapping data for a four dimensional tensor represents at least one of the following parameters:

In this example, the "general wrap" referred to above corresponds to a size of each mapping block along the axis selected, which is less than the size of the tensor along that axis. The size need not be a power of two and indicates the number of lines in each mapping block along the axis selected. The dim0_log 2_wrap, dim1_log 2_wrap, dim2_log 2_wrap and dim3_log 2_wrap values indicate the size of each mapping block along the first to fourth axes respectively, and are either a power of two (if the axis is not selected as allowing for a general wrap) or takes the value of the parameter "shift", discussed below. The dim0_stride, dim1_stride, dim2_stride and dim3_stride values indicate the number of locations in storage between the beginning of successive elements of a tensor. Hence, in this example, the block size is a power of two in all dimensions except the one indicated by the axis_gw_sel parameter. In other examples, though, the block size may be a power of two in more or fewer dimensions than this. Having a non-power-of-two block size in two or more dimensions can increase the complexity of the mapping but may nevertheless be justified for a particular data processing operation that operates more efficiently on blocks that have a non-power-of-two size in two or more dimensions.

As explained above, there may be a difference between the size of a processing block and a mapping block in at least one selected dimension. For example, where an input block of a tensor is to be convolved with a 3×3 filter to produce an output block with a size of 16 in the y dimension (similarly to the examples of FIGS. 2 and 4, discussed further below), the mapping block for example has a size of 18 in the y dimension. In this case, the gen_wrap_size is 18. With a pad of zero, the first processing block to be read from storage corresponds to lines of the tensor with (logical) y co-ordinates from 0 to 17, which are mapped to (physical) y co-ordinates 0 to 17. The second processing block to be read from storage corresponds to lines of the tensor with (logical) y co-ordinates from 16 to 33, which are mapped to (physical) y co-ordinates 16-17 and 0 to 15 (since 33 modulo 18 is 15). There is at most one wrap point in each dimension in this case (where a wrap point is a discontinuity in a set of (physical) co-ordinates for a processing block, such as a jump from a y co-ordinate of 17 to a y co-ordinate of 0), so that there is a single wrap on an axis within a single block. The wrap point can be calculated for each axis at the start of processing a block, for example.

In this example, the inclusion of the recip_gen_wrap_size value allows a compiler associated with the data processing

| Parameter | Size in bits | Description |
|---|---|---|
| axis_gw_sel | 2 | Select which axis allows for general wrap (not power of two) specified by gen_wrap_size; can take different values to indicate which axis is selected |
| dim0_log2_wrap | 4 | Power-of-two mask to apply to dimension 0 (corresponding to 1st axis) or shift if axis_gw_sel == 0) |
| dim1_log2_wrap | 4 | Power-of-two mask to apply to dimension 1 (corresponding to 2nd axis) or shift if axis_gw_sel == 1 |
| dim2_log2_wrap | 4 | Power-of-two mask to apply to dimension 2 (corresponding to 3rd axis) or shift if axis_gw_sel == 2 |
| dim3_log2_wrap | 4 | Power-of-two mask to apply to dimension 2 (corresponding to 4th axis) or shift if axis_gw_sel == 2 |
| dim0_stride | 32 | Dimension 0 stride |
| dim1_stride | 32 | Dimension 1 stride |
| dim2_stride | 32 | Dimension 2 stride |
| gen_wrap_size | 16 | General wrap size (wrap for the axis selected by axis_gw_sel) |
| recip_gen_wrap_size | 32 | Reciprocal multiplier representing 1/gen_wrap_size | system to change a modulo operation as described above into a series of two multiplies, which can be performed efficiently by the processor. The shift value (noted in the table above) to be used in this calculation can be determined as follows:

1. choose shift such that (1<<shift)<gen_wrap_size<= (2<<shift)
2. set recip_gen_wrap_size=floor(((1<<(32+shift))+gen_wrap_size)/gen_wrap_size)
3. set dim[axis_gw_sel]_log 2_wrap=shift Then, a logical co-ordinate of an element of a tensor, given as (u0, u1, u2, u3), can be converted into a (physical) co-ordinate, corresponding to a physical address in storage, such as the storage 108 of FIG. 1, using the following functions:

```
addr_t address_from_co-ordinate(rolling_tensor_descriptor *td, int u0, int u1, int u2, int u3)
{
    addr_t addr = td->pointer; // pointer
    addr += map_axis(td, 0, u0, dim0_log2_wrap, dim0_stride);
    addr += map_axis(td, 1, u1, dim1_log2_wrap, dim1_stride);
    addr += map_axis(td, 2, u2, dim2_log2_wrap, dim2_stride);
    addr += map_axis(td, 3, u3, dim3_log2_wrap, sizeof(td->data_type));
    return addr;
}
addr_t map_axis(rolling_tensor_descriptor *td, int axis, int u, int log2_wrap, int stride)
{
    if ( axis == td->axis_gw_sel) {               // is this the axis with generic wrap?
        q = ( u * recip_gen_wrap_size) >> (32+log2_wrap); // int32 q = u / gen_wrap_size
        u = u - q * gen_wrap_size;                //int16 u = u % gen_wrap size
    } else {
        u = (log2_wrap<15) ? (u & ((1<<log2_wrap)-1)) : u; // power of two wrap
                                                   // unless log2_wrap == 15
    return u * stride;
}
``` where the log 2_wrap parameter value can be set to 15 for a given axis if no address mapping is to be performed along that axis. This calculation thus includes, for the selected dimension (axis_gw_sel), a bit-shift operation applied to an output of a multiplication of a reciprocal of a size of the mapping block (recip_gen_wrap_size) and the logical co-ordinate (u), to calculate a quotient of the logical co-ordinate by the size (q). A further multiplication, of the quotient (q) with the size (gen_wrap_size), is then subtracted from the logical co-ordinate (u). This allows for flexibility, as address mapping can be performed for any of the axes (i.e. any of the dimensions of the tensor) as desired, for example depending on the size of the tensor compared to the size of the storage.

The mapping data in this example is comprised by a tensor descriptor, referred to above as rolling_tensor_descriptor*td. In this example, the tensor descriptor is associated with the tensor for which the mapping is defined, and includes tensor data indicative of at least one further parameter to define the tensor. For example, the tensor descriptor may also include at least one of: the data type, format and logical tensor size of the tensor, so as to define the logical tensor operated on by the processor, using global (logical) co-ordinates. The tensor descriptor may further or alternatively include the address (and co-ordinate strides, if appropriate) of the storage to hold the blocks of tensor, and may be structured to support storages of different sizes, such as a level 2 (L2) cache or main system memory.

Whereas FIG. 1 shows a tensor 102 with non-overlapping processing blocks 104, 106, in other examples, processing blocks of a tensor may be overlapping. FIG. 2 shows such an example schematically, and is not to scale. In FIG. 2, the tensor 202 includes a first block 204, a second block 206 and a third block 210, which in this example are each processing blocks. The first block 204 overlaps the second block 206, the second block 206 overlaps the first and third blocks 204, 210, and the third block 210 overlaps the second block 206.

In this example, the tensor 202 is of logical size 1088 high (in the y dimension)×1920 wide (in the x dimension)×16 channels (in the z dimension), which is about 32 MB, and is divided into blocks corresponding to stripes of 18 high× 1920 wide×16 channels, which is about 540 KB. A tensor may be divided in this way for example if the tensor is to be processed using a 3×3 filter, which acts on 3×3 patches of tensor elements in the x and y dimensions, for each channel in the z dimension. In such a case, producing 16 rows of output (corresponding to a convolution of the filter with a block with a height of 16 rows) requires 18 rows of input as the filter height is 3 rows. The output processing blocks (i.e. the output blocks produced by convolving input blocks of the tensor with the filter) have a size of 16 in they dimension, whereas the mapping blocks have a size of 18 in the y dimension. The input processing blocks (which are the blocks to be convolved with the filter) have a size of 18 in the y dimension and partly overlap each other, as shown in FIG. 2. In this example, they axis is divided into input sub-tensors of height 18, which can be considered to correspond to the following mapping of the y co-ordinate of the tensor 202:

$$y_{physical} = y_{logical} \% \ 18$$

The x and z co-ordinates of each element of the tensor are unchanged. In this case, logical co-ordinates of corresponding elements of each block of a height of 18 rows are mapped to the same (physical) co-ordinates, corresponding to the same physical addresses in storage. In other words, viewed in terms of the tensor 202 as a whole, each block of 18 rows will alias to the same storage. The compiler can schedule operations accordingly to ensure that these aliases are not accessed at the same time.

If the size, s, of each output block is 16 in the y direction, the kernel height, k1, is 3 in the y direction, and p1 indicates the number of additional rows to be processed in order to convolve the kernel with a block in order to produce an output block of the size, s, in the y direction. In this example, as the kernel has a size of 3 in the y direction, 18 input rows are required in order to produce an output block with a height of 16 in the y direction, so p1 is equal to 2 in the y direction. then the first row of the first block 204 is at a y position of −p1 (which is −2 in this example). It is to be appreciated, though, that the y position of the first row of the first block 24 may be different in other examples (such as that discussed above), with a different padding applied to offset the y co-ordinate by a different amount. The final row of the first block 204 is at a y position of s−1 (i.e. at 15). The first row of the second block 206 is at a y position of s−k1+1 (i.e. at 14) and the final row of the second block 206 is at a y position of (2s)−1 (i.e. at 31). The first row of the third block 210 is at a y position of (2s)−k1+1 (i.e. at 30) and the final row of the third block 210 is at a y position of (3s)−1 (i.e. at 47). Hence, in this example, each mapping block includes s+k1−1 rows (i.e. 18 rows), where it is to be appreciated that a row is an example of a line, and is taken in a horizontal direction in the sense of FIG. 2. Row 18 of the tensor 202 (corresponding to the first row of the second block 206) thus aliases with row 0 of the tensor 202 (corresponding to the first row of the first block 204) in the storage.

In this example, the processing blocks are overlapping in a single dimension (the y dimension) for ease of processing. However, in other cases, processing blocks may overlap in more than one dimension, or may not overlap in any dimensions.

A tensor can be divided into processing blocks as described above before processing each block separately. For example, an input tensor can be divided into sub-tensors (each corresponding to a respective processing block) and a sequence of operations can be applied to each sub-tensor in turn (referred to as cascading) rather than applying the sequence of operations to the whole input tensor.

As an example, operations defined by operators op[k] for 0<=k<num_ops, can be applied in turn to an input tensor, defined as tensor[0], such that tensor[k+1]=op[k]([tensor][k]), so as to achieve a final result, tensor[num_ops]. Rather than performing the loop:

```
for (k = 0; k<num_ops; k++) {
    for (t = 0; t < num_sub_tensors; t++) {
        tensor[k+1][t] = op[k](tensor[k][t])
    }
}
``` where num_sub_tensors=the number of sub-tensors (which in this case, equals the number of blocks), the processing can be reordered to the loop:

```
for (t = 0; t < num_sub_tensors; t++) {
    for (k = 0; k<num_ops; k++) {
        tensor[k+1][t] = op[k](tensor[k][t])
    }
}
```

With this reordering, the intermediate sub-tensors, tensor [k][t] for 0<k<num_ops are for example smaller than the whole tensor and can thus be stored in smaller storage. This can for example reduce access to higher-level and/or external storage such as a dynamic random access memory (DRAM), as the intermediate sub-tensors can be stored in the storage (which may be a relatively compact storage, such as a cache).

The mapping techniques described herein facilitate efficient reading and/or writing of intermediate sub-tensors such as these. For example, an application operating on a processor will typically work in the global co-ordinate space of the tensor. However, the mapping approaches described herein can be used to map global tensor co-ordinates to physical addresses in the storage for storing blocks of the tensor (corresponding to sub-tensors). The mapping in examples herein maps logical co-ordinates in such a way that the same storage can be used for each sub-tensor (i.e. for each block) of the tensor. In other words, logical co-ordinates of the tensor[k][t] and the tensor[k][t+1] are mapped to the same (physical) co-ordinates in at least one selected dimension of the tensor, corresponding to the same set of physical addresses in the storage. This maintains each block of the tensor in storage while it is needed, reducing the number of times the same block is written into the storage. For example, a given block may be written into the storage a single time, then read one or more times to perform desired processing of the block (e.g. to apply an operation of the sequence of operations to the block), before the next block is written into the storage to at least partially overwrite the given block. Furthermore, this mapping can handle overlapping processing blocks, such as those shown in FIG. 2.

Figures 3, 4:
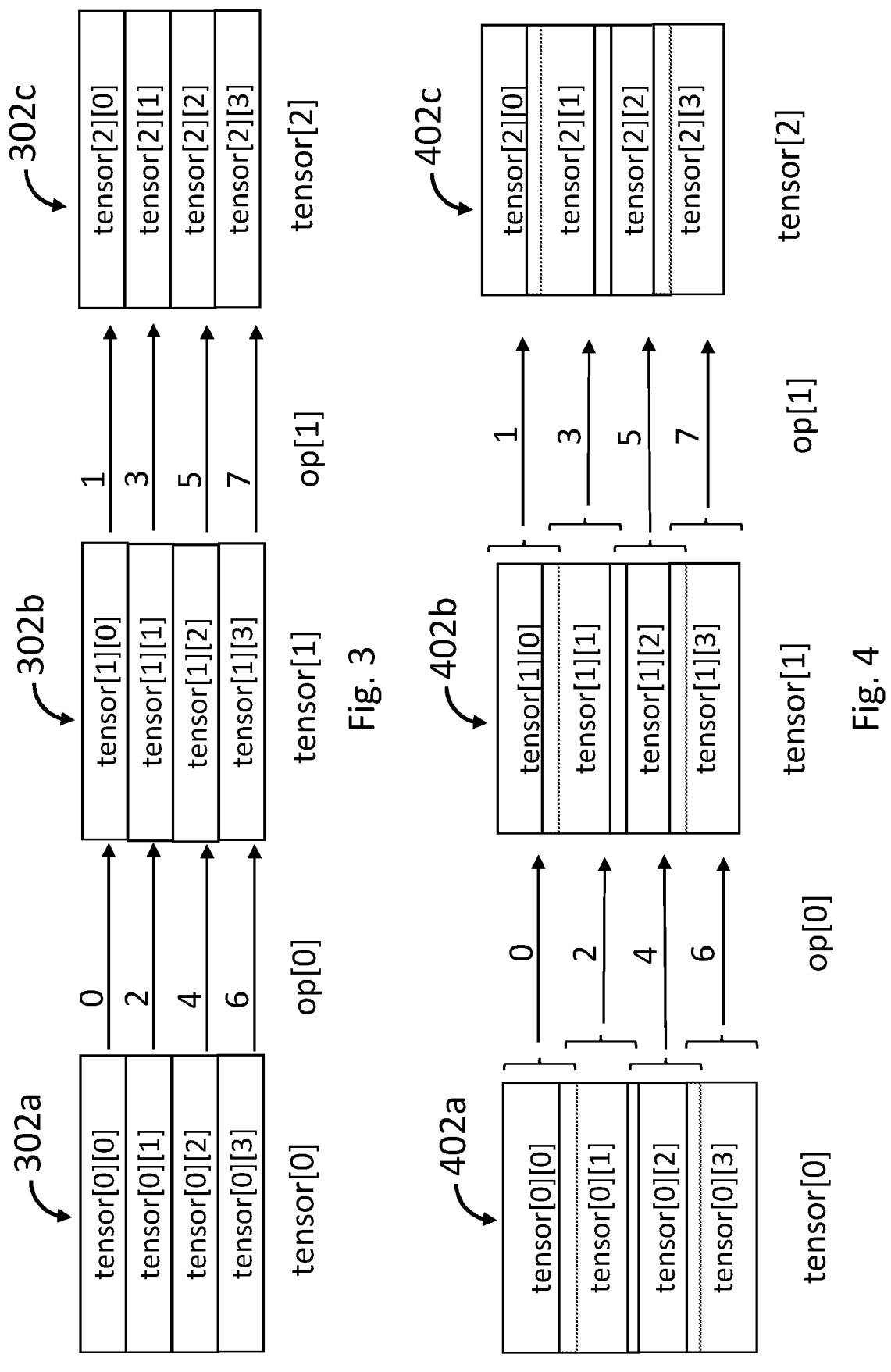
FIG. 3 is a schematic representation of the application of a sequence of operations to a tensor with non-overlapping blocks according to examples.
FIG. 4 is a schematic representation of the application of a sequence of operations to a tensor with overlapping blocks according to examples.

FIG. 3 is a schematic representation of the application of a sequence of operations to a tensor with non-overlapping processing blocks (referred to as "blocks" in the following description, for brevity) according to examples. In FIG. 3, a command has been received (e.g. from a host processor) to apply the sequence of operations recursively to an input tensor 302a, shown as tensor[0] in FIG. 3. The input tensor 302a is divided into sub-tensors, which each correspond to a respective block (in this example, a stripe) of the input tensor 302a. The sub-tensors of the input tensor 302a are labelled as tensor[0][0], tensor[0][1], tensor[0][2] and tensor [0][3] in FIG. 3.

In FIG. 3, the sequence of operations includes two operations: op[1] and op[2]. The output of each operation in the sequence is used as an input to the next operation in the sequence. In this way, the sequence of operations is applied recursively to the input tensor 302a to generate an output tensor 302c, shown as tensor[2] in FIG. 3. Applying the sequence of operations in this manner generates an intermediate tensor 302b, blocks of which are stored in storage using the mapping described herein.

In this example, the sequence of operations is applied recursively to respective blocks of the input tensor 302a. The first operation, op[0], is applied to a first block, tensor [0][0], of the input tensor 302a to generate a first block, tensor[1][0], of an intermediate tensor 302b. The second operation, op[1], is then applied to the first block, tensor[1] [0], of the intermediate tensor 302b to generate a first block of the output tensor 302c, tensor[2][0]. The first block, tensor[1][0], of the intermediate tensor 302b is written to the storage according to the mapping described herein.

The sequence of operations is then applied in a similar manner to a second block, tensor[0][1] of the input tensor 302a. Application of the first operation op[0] to the second block, tensor[0][1], of the input tensor 302a generates a second block, tensor[1][1], of the intermediate tensor 302b. The second operation op[1] is applied to the second block, tensor[1][1], of the intermediate tensor 302b to generate a second block, tensor[2][1], of the output tensor 302c. In this case, the second block, tensor[1][1], of the intermediate tensor 302b is written to the storage to overwrite the first block, tensor[1][0] of the intermediate tensor 302b. Corresponding elements of the first and second blocks, tensor[1] [0] and tensor[1][1], of the intermediate tensor 302b have different logical co-ordinates in at least one selected dimension but are nevertheless mapped to the same (physical) co-ordinates in the at least one selected dimension, corresponding to the same physical addresses in the storage. In this way, the storage is re-used for successive blocks of the intermediate tensor 302b. The storage hence need not store the entirety of the intermediate tensor 302b and can instead merely store a block of the intermediate tensor 302b. The storage can thus be smaller than otherwise. It is to be appreciated that the first and second blocks, tensor[1][0] and tensor[1][1], of the intermediate tensor 302b can additionally be retrieved from the storage by the processor, e.g. to process using the second operation, op[1], using the mapping as described herein.

In FIG. 3, the sequence of operations is subsequently applied to third and fourth blocks, tensor[0][2] and tensor [0][3], of the input tensor 302a to generate third and fourth blocks, tensor[2][2] and tensor[2][3], of the output tensor 302c. In this way, the output tensor, tensor[2], which is formed of four blocks: tensor[2][0] to tensor[2][3], is generated in an efficient manner, on a block-by-block basis.

The example of FIG. 3 is a simple example, in which the sequence of operations includes two operations. However, in other examples, there may be more than two operations. In such cases, a block of a first intermediate tensor (obtained by recursive application of a first part of the sequence of operations to an input tensor) can be written to the storage as described above. The block of the first intermediate tensor can then be read from the storage, e.g. using the mapping, and processed with a second part of the sequence of operations to generate a second intermediate tensors, which can be written into the storage, based on the mapping data indicative of the mapping, to at least partially overwrite the block of the first intermediate tensor. In other words, in examples such as these, logical co-ordinates of corresponding elements of each block of a tensor and of at least one further tensor derived from the tensor are mapped to the same (physical) co-ordinates, in at least one selected dimension, corresponding to the same addresses in the storage.

FIG. 4 is a schematic representation of the application of a sequence of operations to a tensor (an input tensor 402a) with overlapping processing blocks (referred to as "blocks" in the following description, for brevity) according to examples. The processing represented by FIG. 4 is the same as that of FIG. 3 except that the blocks of the input tensor 402a overlap each other in FIG. 4, whereas the blocks of the input tensor 302a are non-overlapping in FIG. 3. Similarly, the blocks of an intermediate tensor 402b, generated by applying the first operation op[0] to the input tensor 402a, overlap each other, and the blocks of an output tensor 402c, generated by applying the second operation op[1] to the intermediate tensor 402b also overlap each other in FIG. 4. However, the blocks of the intermediate tensor 402b of FIG. 4 are successively written to and read from storage in a similar manner to the blocks of the intermediate tensor 302b of FIG. 3, using a mapping from logical to physical co-ordinates in which logical co-ordinates of corresponding elements of each block are mapped to the same (physical) co-ordinates, in a similar way to that described with respect to FIG. 2.

Figures 5, 6:
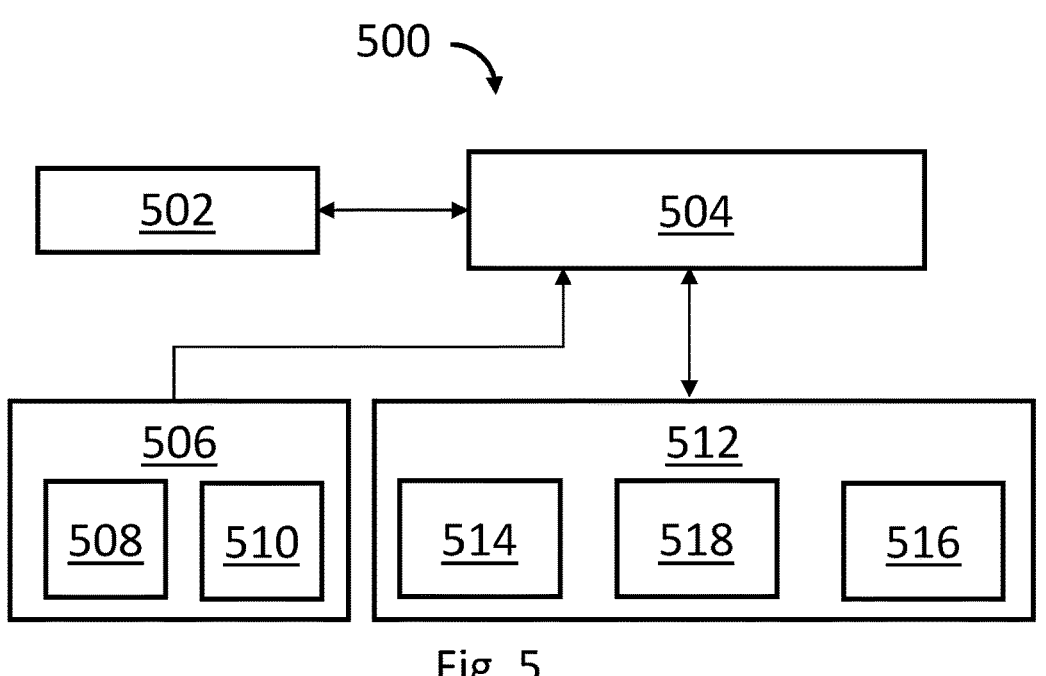
FIG. 5 is a schematic diagram of a data processing system according to examples.
FIG. 6 is a schematic diagram of a data processing system according to a further examples.

FIG. 5 is a schematic diagram of a data processing system 500 that may be used with examples herein, in which a tensor to be processed represents a feature map for processing using a neural network. As explained above, a neural network typically includes a sequence of layers of processing, with an output from each layer being used as an input to the next layer. Each layer for example processes an input feature map to generate an output feature map, which is used as the input feature map for the next layer. The term "feature map" is used generically herein to refer to either an input feature map or an output feature map. The processing performed by a given layer may be taken to correspond to an operation of a sequence of operations as described with reference to FIGS. 3 and 4.

In FIG. 5, the data processing system 500 includes a central processing unit (CPU) 502 and a neural network processing unit (NPU) 504. The NPU 504 may include a dedicated processor for performing neural network processing and/or at least one other suitable processor for performing such processing. The data processing system 500 includes a memory 506 for storing a command stream 508, for controlling the operation of the NPU 504. The command stream 508 is generated by a host processor, in this case by the CPU 502. Various parameters 510 associated with the neural network are also stored in the memory 506, such as neural network weights. The memory 506 is for example a DRAM, although other types of memory may be used in other examples.

In addition to the memory 506, the data processing system 500 also includes a storage system 512, for storing data to be processed by or generated by the NPU 504 in the implementation of the neural network. The storage system 512 is for example a static random access memory (SRAM), but other types of memory could be used instead. In this example, the storage system 512 includes a portion for storing an input tensor 514 (representing an input feature map) and an output tensor 516 (representing an output feature map). The storage system 512 also includes storage 518 for storing blocks of tensors according to the methods herein, in which logical co-ordinates of corresponding elements of each block of a tensor (and/or a further tensor derived from the tensor) are mapped to the same (physical) co-ordinates in at least one selected dimension, corresponding to the same physical address in the storage 518. In other words, the storage 518 can be used to store blocks of intermediate tensors generated during a cascade of operations (each of which may correspond to a layer of a neural network). The storage 518 may be considered to be a rolling buffer, and may be an SRAM such as a L2 cache. The storage 518 in this case is too small to store an entire input tensor 514 or an entire output tensor 516 but is nevertheless large enough to store blocks of a tensor, such as an intermediate tensor generated by processing an input tensor (e.g. corresponding to an intermediate feature map).

The storage 518 may additionally store mapping data for controlling the mapping performed by the NPU 504 in order to interact with the data in the storage 518. For example, the mapping data may be stored in the form of a tensor descriptor associated with a tensor. In such cases, the tensor descriptor associated with a particular tensor may be sent to the NPU 504 along with instructions to process that particular tensor. The mapping may then be calculated by a direct memory access (DMA) unit (not shown) of the NPU 504, using the tensor descriptor, in order to identify the physical addresses in the storage 518 for given logical co-ordinates of a tensor to be processed by the NPU 504 (which is e.g. a tensor derived from the tensor associated with the tensor descriptor).

This is merely an example, though, and in other cases the storage for which the mapping is performed may be of a different type than an SRAM and/or the mapping data and blocks of a tensor may be stored in different storage systems than each other. In yet further examples, the methods described herein may be implemented by a different processor than the NPU 504, such as a graphics processor unit (GPU). In such cases, tensors may represent image data rather than feature maps, and the command stream 508 generated by the CPU 502 may instruct the GPU to perform graphics processing.

The various components of the data processing system 500 of FIG. 5 may be interconnected using a bus. This allows data to be transferred between the various components. The bus may be or include any suitable interface or bus. For example, an ARM® Advanced Microcontroller Bus Architecture (AMBAC) interface, such as the Advanced eXtensible Interface (AXI), may be used.

In further examples, the methods herein may be implemented using a processor that provides dedicated circuitry that can be used to perform operations which would normally be undertaken by dedicated hardware accelerators, such as an NPU and a GPU. FIG. 6 shows schematically an example of a data processing system 600 including such a processor 630. It will be appreciated that the types of hardware accelerator which the processor 630 may provide dedicated circuitry for is not limited to that of an NPU or GPU but may be dedicated circuitry for any type of hardware accelerator. GPU shader cores may be well-suited for performing certain types of arithmetic operations such as neural processing operations, as these operations are generally similar to the arithmetic operations that may be required when performing graphics processing work (but on different data). Furthermore, graphics processors typically support high levels of concurrent processing (e.g. supporting large numbers of execution threads), and are optimized for data-plane (rather than control plane) processing, all of which means that graphics processors may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable, to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 630 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor, this means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 6, the processor 630 is arranged to receive a command stream 620 from a host processor 610, such as a CPU. The command stream comprises at least one command in a given sequence, each command to be executed, and each command may be decomposed into a number of tasks. These tasks may be self-contained operations, such as a given machine learning operation or a graphics processing operation. It will be appreciated that there may be other types of tasks depending on the command.

The command stream 620 is sent by the host processor 610 and is received by a command processing unit 640 which is arranged to schedule the commands within the command stream 620 in accordance with their sequence. The command processing unit 640 is arranged to schedule the commands and decompose each command in the command stream 620 into at least one task. Once the command processing unit 640 has scheduled the commands in the command stream 620, and generated a plurality of tasks for the commands, the command processing unit issues each of the plurality of tasks to at least one compute unit 650*a*, 650*b* each of which are configured to process at least one of the plurality of tasks.

The processor 630 comprises a plurality of compute units 650*a*, 650*b*. Each compute unit 650*a*, 650*b*, may be a shader core of a GPU specifically configured to undertake a number of different types of operations, however it will be appreciated that other types of specifically configured processor may be used, such as a general-purpose processor configured with individual compute units, such as compute units 650*a*, 650*b*. Each compute unit 650*a*, 650*b* comprises a number of components, and at least a first processing module 652*a*, 652*b* for executing tasks of a first task type, and a second processing module 654*a*, 654*b* for executing tasks of a second task type, different from the first task type. In some examples, the first processing module 652*a*, 652*b* may be a processing module for processing neural processing operations, such as those which would normally be undertaken by a separate NPU as described above with reference to FIG. 5. Similarly, the second processing module 654*a*, 654*b* may be a processing module for processing graphics processing operations forming a set of pre-defined graphics processing operations which enables the implementation of a graphics processing pipeline. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652*a*, 652*b* of a given compute unit 650*a*, 650*b*, and tasks of a second task type to the second processing module 654*a*, 654*b* of a given compute unit 650*a*, 650*b*. Continuing the example above, the command processing unit 640 would issue machine learning/neural processing tasks to the first processing module 652*a*, 652*b* of a given compute unit 650*a*, 650*b* where the first processing module 652*a*, 652*b* is optimized to process neural network processing tasks, for example by comprising an efficient means of handling a large number of multiply-accumulate operations. Similarly, the command processing unit 640 would issue graphics processing tasks to the second processing module 654a, 654b of a given compute unit 650a, 650b where the second processing module 652a, 654a is optimized to process such graphics processing tasks.

In addition to comprising a first processing module 652a, 652b and a second processing module 654a, 654b, each compute unit 650a, 650b also comprises a memory in the form of a local cache 656a, 656b for use by the respective processing module 652a, 652b, 654a, 654b during the processing of tasks. Examples of such a local cache 656a, 656b is a L1 cache. The local cache 656a, 656b may, for example, a synchronous dynamic random-access memory (SDRAM). For example, the local cache 656a, 656b may comprise a double data rate synchronous dynamic random-access memory (DDR-SDRAM). It will be appreciated that the local cache 656a, 656b may comprise other types of memory.

The local cache 656a, 656b is used for storing data relating to the tasks which are being processed on a given compute unit 650a, 650b by the first processing module 652a, 652b and second processing module 654a, 654b. It may also be accessed by other processing modules (not shown) forming part of the compute unit 650a, 650b the local cache 656a, 656b is associated with. However, in some examples it may be necessary to provide access data associated with a given task executing on a processing module of a given compute unit 650a, 650b to a task being executed on a processing module of another compute unit (not shown) of the processor 630. In such examples, the processor 630 may also comprise storage 660, for example a cache, such as an L2 cache, for providing access to data use for the processing of tasks being executed on different compute units 650a, 650b.

By providing a local cache 656a, 656b tasks which have been issued to the same compute unit 650a, 650b may access data stored in the local cache 656a, 656b, regardless of whether they form part of the same command in the command stream 620. The command processing unit 640 is responsible for allocating tasks of commands to given compute units 650a, 650b such that they can most efficiently use the available resources, such as the local cache 656a, 656b, thus reducing the number of read/write transactions required to memory external to the compute units 650a, 650b, such as the storage 660 (L2 cache) or higher level memories. One such example, is that a task of one command issued to a first processing module 652a of a given compute unit 650a, may store its output in the local cache 656a such that it is accessible by a second task of a different (or the same) command issued to a given processing module 652a, 654a of the same compute unit 650a.

One or more of the command processing unit 640, the compute units 650a, 650b, and the storage 660 may be interconnected using bus. This allows data to be transferred between the various components. The bus may be or include any suitable interface or bus. For example, an ARM® Advanced Microcontroller Bus Architecture (AMBAC) interface, such as the Advanced eXtensible Interface (AXI), may be used.

Tasks executed by the first and/or second processing modules 652a, 652b, 654a, 654b may include the processing of tensors, for example to implement a neural network or to perform graphics processing. In such examples, blocks of tensors may be stored in the storage 660, with logical co-ordinates of corresponding elements of each block of a tensor (and/or a further tensor derived from the tensor) mapped to the same (physical) co-ordinates, in at least one selected dimension, corresponding to the same physical addresses in the storage 660, which is accessible to the first and second processing modules 652a, 652b, 654a, 654b. In some cases, the processor 630 may include further memory (not shown in FIG. 6), of which the storage 660 forms a part. In such cases, whole tensors may be stored in the further memory. In yet further cases, though, whole tensors may be stored externally to the processor 630 and read from external storage in a block-by-block fashion when processed by the first and/or second processing modules 652a, 652b, 654a, 654b. Mapping data, e.g. representing a tensor descriptor for a tensor to be processed by the first and/or second processing modules 652a, 652b, 654a, 654b, may similarly be stored in the storage 660 or in further memory.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A processor comprising tensor processing circuitry to:

obtain mapping data indicative of at least one mapping parameter for a plurality of mapping blocks of a multi-dimensional tensor to be mapped, wherein the at least one mapping parameter is for mapping corresponding elements of each mapping block to the same co-ordinate in at least one selected dimension of the multi-dimensional tensor, such that each mapping block corresponds to the same set of co-ordinates in the at least one selected dimension;

determine, based on the mapping data, a co-ordinate of an element of a block of the multi-dimensional tensor, a mapping block of the plurality of mapping blocks comprising the element;

determine, based on the co-ordinate, a physical address in a memory corresponding to the co-ordinate; and access the memory at the physical address in a process comprising an interaction between the block of the multi-dimensional tensor and the memory.

2. The processor according to claim 1, wherein the processor is to:

receive a command to apply a sequence of operations recursively to an input multi-dimensional tensor; and apply the sequence of operations in turn to respective blocks of a plurality of blocks of the input multi-dimensional tensor, wherein the block of the multi-dimensional tensor is a block of an intermediate multi-dimensional tensor generated by application of part of the sequence of operations to a corresponding block of the input multi-dimensional tensor.

3. The processor according to claim 2, wherein the block of the intermediate multi-dimensional tensor is a block of a first intermediate multi-dimensional tensor generated by application of a first part of the sequence of operations to the input multi-dimensional tensor, and the processor is to:

read the block of the first intermediate multi-dimensional tensor from the memory;

apply a second part of the sequence of operations, immediately subsequent to the first part of the sequence of operations, to the block of the first intermediate multi-dimensional tensor to generate a corresponding block of a second intermediate multi-dimensional tensor; and write the block of the second intermediate multi-dimensional tensor to the memory, based on the mapping data, to at least partially overwrite the block of the first intermediate multi-dimensional tensor.

4. The processor according to claim 1, wherein the at least one mapping parameter is representative of: which of a plurality of dimensions of the multi-dimensional tensor is the at least one selected dimension, a size of each mapping block in each of the at least one selected dimension and/or an indication that each of at least one other dimension of the multi-dimensional tensor is unmapped.

5. The processor according to claim 4, wherein the at least one mapping parameter is representative of the size, s, of each mapping block in each of the at least one selected dimension, and the mapping corresponds to a modulo s operation applied to a given logical co-ordinate of a given element of the mapping block, in each of the at least one selected dimension.

6. The processor according to claim 4, wherein the at least one mapping parameter is representative of a reciprocal of the size, s, of each mapping block in each of the at least one selected dimension.

7. The processor according to claim 1, wherein to determine, based on the mapping data, the co-ordinate of the element of the block of the multi-dimensional tensor, the processor is to perform the mapping, the mapping comprising, in a dimension of the at least one selected dimension:
    a bit-shift operation applied to an output of a multiplication of a reciprocal of a size of the mapping block in the dimension and a logical co-ordinate of the element in the dimension, to calculate a quotient of the logical co-ordinate by the size; and
    a subtraction of a further multiplication, of the quotient with the size, from the logical co-ordinate in the dimension.

8. The processor according to claim 7, wherein the mapping data comprises a shift value for performing the bit-shift operation.

9. The processor according to claim 1, wherein the processor is to receive a tensor descriptor comprising the mapping data, wherein the tensor descriptor is associated with the multi-dimensional tensor and comprises tensor data indicative of at least one further parameter to define the multi-dimensional tensor.

10. The processor according to claim 1, wherein a size of each mapping block of the multi-dimensional tensor in each dimension is a power of two.

11. The processor according to claim 1, wherein the at least one selected dimension is a single selected dimension, a size of each mapping block of the multi-dimensional tensor in the single selected dimension is not a power of two and a size of each mapping block of the multi-dimensional tensor in each other dimension is a power of two or is a size of the multi-dimensional tensor in that dimension.

12. The processor according to claim 1, wherein the mapping blocks of the multi-dimensional tensor are non-overlapping.

13. The processor according to claim 1, wherein the multi-dimensional tensor comprises a plurality of processing blocks, comprising the block, for processing using the processor, and the plurality of processing blocks of the multi-dimensional tensor partly overlap each other.

14. The processor according to claim 13, wherein the processing blocks of the multi-dimensional tensor partly overlap each other in the at least one selected dimension and are non-overlapping in each other dimension of the multi-dimensional tensor.

15. The processor according to claim 1, comprising a command processing unit to:
    receive, from a host processor, a sequence of commands to be executed;
    generate a plurality of tasks based on the sequence of commands; and
    issue each of the plurality of tasks to the processor for execution,
    wherein the processor comprises:
        a first processing module for executing tasks of a first task type generated by the command processing unit; and
        a second processing module for executing tasks of a second task type, different from the first task type, generated by the command processing unit,
    and wherein the memory is accessible to at least the first processing module and the second processing module.

16. The processor according to claim 15, wherein the first task type is a task for undertaking at least a portion of a graphics processing operation forming one of a set of pre-defined graphics processing operations which collectively enable an implementation of a graphics processing pipeline, and the second task type is a task for undertaking at least a portion of a neural processing operation.

17. A method performed by a processor comprising tensor processing circuitry, the method comprising:
    obtaining mapping data indicative of at least one mapping parameter for a plurality of mapping blocks of a multi-dimensional tensor to be mapped, wherein the at least one mapping parameter is for mapping corresponding elements of each mapping block to the same co-ordinate in at least one selected dimension of the multi-dimensional tensor, such that each mapping block corresponds to the same set of co-ordinates in the at least one selected dimension;
    determining, based on the mapping data, a co-ordinate of an element of a block of the multi-dimensional tensor, a mapping block of the plurality of mapping blocks comprising the element;
    determining, based on the co-ordinate, a physical address in a memory corresponding to the co-ordinate; and
    accessing the memory at the physical address in a process comprising an interaction between the block of the multi-dimensional tensor and the memory.

18. The method according to claim 17, comprising:
    receiving a command to apply a sequence of operations recursively to an input multi-dimensional tensor; and
    applying the sequence of operations in turn to respective blocks of a plurality of blocks of the input multi-dimensional tensor,
    wherein the block of the multi-dimensional tensor is a block of an intermediate multi-dimensional tensor generated by application of part of the sequence of operations to a corresponding block of the input multi-dimensional tensor.

19. The method according to claim 17, comprising:
    receiving at a command processing unit, from a host processor, a sequence of commands to be executed;
    generating, at the command processing unit, a plurality of tasks based on the sequence of commands; and
    issuing, by the command processing unit, each of the plurality of tasks to the processor, wherein the processor comprises:

a first processing module for executing tasks of a first task type; and a second processing module for executing tasks of a second task type, and wherein the memory is accessible to at least the first processing module and the second processing module.

20. A non-transitory computer-readable storage medium comprising a set of computer-readable instructions stored thereon which, when executed by at least one processor comprising tensor processing circuitry, are arranged to cause the at least one processor to:

obtain mapping data indicative of at least one mapping parameter for a plurality of mapping blocks of a multi-dimensional tensor to be mapped, wherein the at least one mapping parameter is for mapping corresponding elements of each mapping block to the same co-ordinate in at least one selected dimension of the multi-dimensional tensor, such that each mapping block corresponds to the same set of co-ordinates in the at least one selected dimension;

determine, based on the mapping data, a co-ordinate of an element of a block of the multi-dimensional tensor, a mapping block of the plurality of mapping blocks comprising the element;

determine, based on the co-ordinate, a physical address in a memory corresponding to the co-ordinate; and access the memory at the physical address in a process comprising an interaction between the block of the multi-dimensional tensor and the memory.

\* \* \* \* \*